United States Patent
Kwon et al.

(10) Patent No.: US 11,858,507 B2
(45) Date of Patent: Jan. 2, 2024

(54) METHODS FOR COGNITIVE SITUATION AWARENESS USING AN ATTENTION-BASED EVENT STRUCTURE

(71) Applicant: GM GLOBAL TECHNOLOGY OPERATIONS LLC, Detroit, MI (US)

(72) Inventors: Hyukseong Kwon, Thousand Oaks, CA (US); Rajan Bhattacharyya, Sherman Oaks, CA (US); Michael J. Daily, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 17/147,782

(22) Filed: Jan. 13, 2021

(65) Prior Publication Data

US 2022/0219685 A1 Jul. 14, 2022

(51) Int. Cl.
*B60W 30/095* (2012.01)
*B60W 30/09* (2012.01)
*B60W 60/00* (2020.01)
*B60W 40/04* (2006.01)

(52) U.S. Cl.
CPC ........ *B60W 30/0956* (2013.01); *B60W 30/09* (2013.01); *B60W 40/04* (2013.01); *B60W 60/0027* (2020.02); *B60W 2420/42* (2013.01); *B60W 2554/4041* (2020.02); *B60W 2554/4045* (2020.02)

(58) Field of Classification Search
CPC .. B60W 30/0956; B60W 30/09; B60W 40/04; B60W 60/0027; B60W 2420/42; B60W 2554/4041; B60W 2554/4045
See application file for complete search history.

(56) References Cited

U.S. PATENT DOCUMENTS

| | | | | |
|---|---|---|---|---|
| 9,511,767 | B1* | 12/2016 | Okumura | G08G 1/0104 |
| 2019/0213429 | A1* | 7/2019 | Sicconi | G06F 3/012 |
| 2020/0342620 | A1* | 10/2020 | Zagajac | G08G 1/163 |
| 2022/0126864 | A1* | 4/2022 | Moustafa | G05D 1/0061 |

* cited by examiner

*Primary Examiner* — Peter D Nolan
*Assistant Examiner* — Anwar Mohamed
(74) *Attorney, Agent, or Firm* — Quinn IP Law

(57) ABSTRACT

A method of using perception-inspired event generation for situation awareness for a vehicle, including receiving perception input data from a sensor of the vehicle and processing the perception input data to classify and generate parameters related to an external entity in a vicinity of the vehicle. The method includes generating a hierarchical event structure that classifies and prioritizes the perception input data by classifying the external entity into an attention zone and prioritizing the external entity within the attention zone according to a risk level value for the external entity. A higher risk level value indicates a higher priority within the attention zone. The method further includes developing a behavior plan for the vehicle based on the hierarchical event structure.

20 Claims, 7 Drawing Sheets

METHODS FOR COGNITIVE SITUATION AWARENESS USING AN ATTENTION-BASED EVENT STRUCTURE

INTRODUCTION

The present disclosure relates generally to vehicles controlled by automated driving systems, particularly those configured to automatically control vehicle steering, acceleration, and braking during a drive cycle without human intervention.

The operation of modern vehicles is becoming more automated, i.e., able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, embodiments according to the present disclosure incorporate a prioritized attention-based event structure to enable effective situation awareness.

In one aspect of the present disclosure, a method of controlling a vehicle includes receiving, by a controller, perception input data from a sensor of the vehicle and processing, by the controller, the perception input data to classify and generate parameters related to an external entity in a vicinity of the vehicle using human perception inspired cognitive analysis. The method includes generating, by the controller, a hierarchical event structure that classifies and prioritizes the perception input data by classifying the external entity into one of a high attention zone, a low attention zone, and a no attention zone. The method further includes developing, by the controller, a behavior plan for the vehicle and generating, by the controller, a control signal to control an actuator of the vehicle.

In some aspects, the perception input data includes entity data relative to the external entity in the vicinity of the vehicle including one or more of a lane position of the external entity in the vicinity of the vehicle, a predicted path of the external entity relative to the vehicle, and a location and orientation of one or more traffic lanes relative to the vehicle. The perception input data also includes vehicle characteristic data of the vehicle including one or more of vehicle speed, braking, and projected path of travel of the vehicle.

In some aspects, processing the perception input data using human perception inspired cognitive analysis includes generating a zone attention level value for the external entity, estimating a behavior attention level value for the external entity, calculating a risk level value for the external entity, determining if an anomaly is detected, and, when the anomaly is detected, changing the zone attention level value for the external entity.

In some aspects, generating the zone attention level value for the external entity includes evaluating the predicted path of the external entity relative to the vehicle, the location and orientation of the one or more traffic lanes relative to the vehicle, and the projected path of travel of the vehicle.

In some aspects, generating the hierarchical event structure includes prioritizing the external entity within an attention zone according to the risk level value for the external entity, wherein a higher risk level value indicates a higher priority within the attention zone.

In some aspects, the zone attention level value for the external entity expressed as $x_i$ is calculated as $L_{ZA}(x_i)=S_{xi}(Z+\alpha C(x_i))$, where Z is a baseline zone attention level value for the external entity, $C(x_i)$ is a computation of complexity for the external entity, and $S_{xi}$ is a sigmoid function.

In some aspects, the baseline zone attention level value, Z, is zero for a no attention zone, 0.4 for a low attention zone, and 0.8 for a high attention zone.

In some aspects, the behavior attention level value for the external entity expressed as $x_i$ is calculated as $L_{BA}(x_i)=f_{BA1}(p_{xi}-p_D, v_{xi}-v_D, h_{xi}-h_D)$, where $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, and $h_D$ is a desired heading angle of the external entity.

In some aspects, performing the risk level analysis for the external entity includes calculating a risk value for the external entity, and the risk value for the external entity expressed as $x_i$ is calculated as $R(x_i)=L_{ZA}(x_i) \cdot L_{BA}(x_i)$.

In some aspects, the behavior attention level value for the external entity $x_i$ is calculated as $L_{BA}(x_i)=\alpha \cdot S_p(p_{xi}-p_D)+\beta \cdot S_v(v_{xi}-v_D)+(1-\alpha-\beta) \cdot S_h(h_{xi}-h_D)$, where $\alpha$ and $\beta$ are weights such that $(0 \leq \alpha+\beta \leq 1)$, $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, $h_D$ is a desired heading angle of the external entity, and $S_m(n)$ is a sigmoid function for an 'm' component which converges beyond minimum and maximum 'n' values.

In another aspect of the present disclosure, an automotive vehicle, includes a plurality of environment sensors configured to detect external features in the vicinity of the automotive vehicle, a plurality of vehicle sensors configured to detect a vehicle characteristic, an actuator configured to control vehicle steering, acceleration, braking, or shifting, and at least one controller in electronic communication with respective sensors of the plurality of environment sensors, the plurality of vehicle sensors, and the actuator. The at least one controller is programmed with an automated driving system control algorithm and is configured to automatically control the actuator based on the automated driving system control algorithm. The automated driving control system algorithm includes a perception system configured to receive perception input data from the plurality of environment sensors and vehicle characteristic data from the plurality of vehicle sensors and a cognitive situation awareness module configured to process the perception input data and the vehicle characteristic data to analyze an external entity in a vicinity of the automotive vehicle using human perception inspired cognitive analysis. The analysis includes generating a hierarchical event structure that classifies and prioritizes the perception input data by classifying the external entity into one of a high attention zone, a low attention zone, and a no attention zone. The automated driving control system algorithm also includes a vehicle control module configured to develop a behavior plan for the automotive vehicle including a projected path of travel. The at least one controller is further programmed to control the actuator according to the behavior plan.

In some aspects, the cognitive analysis performed by the cognitive situation awareness module includes generating a zone attention level value for the external entity, estimating a behavior attention level value for the external entity, calculating a risk level value for the external entity, determining if an anomaly is detected, and, when the anomaly is detected, changing the zone attention level value for the external entity.

In another aspect of the present disclosure, a method of using perception-inspired event generation for situation awareness for a vehicle includes receiving, by a controller, perception input data from a sensor of the vehicle and processing, by the controller, the perception input data to classify and generate parameters related to an external entity in a vicinity of the vehicle. The method further includes generating, by the controller, a hierarchical event structure that classifies and prioritizes the perception input data by classifying the external entity into an attention zone and prioritizing the external entity within the attention zone according to a risk level value for the external entity. A higher risk level value indicates a higher priority within the attention zone. The method also includes developing, by the controller, a behavior plan for the vehicle based on the hierarchical event structure.

In some aspects, the attention zone is one of a high attention zone, a low attention zone, and a no attention zone.

In some aspects, the perception input data includes entity data relative to the external entity in the vicinity of the vehicle including one or more of a lane position of the external entity in the vicinity of the vehicle, a predicted path of the external entity relative to the vehicle, and a location and orientation of one or more traffic lanes relative to the vehicle. The perception input data also includes vehicle characteristic data of the vehicle including one or more of vehicle speed, braking, and projected path of travel of the vehicle.

In some aspects, processing the perception input data includes generating a zone attention level value for the external entity, estimating a behavior attention level value for the external entity, calculating the risk level value for the external entity, and determining if an anomaly is detected, and, when the anomaly is detected, changing the zone attention level value for the external entity.

In some aspects, when the anomaly is detected, the external entity is classified in an urgent attention zone.

In some aspects, generating the zone attention level value for the external entity includes evaluating the predicted path of the external entity relative to the vehicle, the location and orientation of the one or more traffic lanes relative to the vehicle, and the projected path of travel of the vehicle.

In some aspects, the behavior attention level value for the external entity $x_i$ is calculated as $L_{BA}(x_i)=\alpha \cdot S_p(p_{xi}-p_D)+\beta \cdot S_v(v_{xi}-v_D)+(1-\alpha-\beta) \cdot S_h(h_{xi}-h_D)$, where $\alpha$ and $\beta$ are weights such that $(0 \leq \alpha+\beta \leq 1)$, $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, $h_D$ is a desired heading angle of the external entity, and $S_m(n)$ is a sigmoid function for an 'm' component which converges beyond minimum and maximum 'n' values.

In some aspects, the risk level value is compared to a predetermined risk threshold and when the risk level value is below the predetermined risk threshold, the external entity is classified in a no attention zone and the perception data regarding the external entity is not stored by the controller.

BRIEF DESCRIPTION OF THE DRAWINGS

The present disclosure will be described in conjunction with the following figures, wherein like numerals denote like elements.

Figure 1:
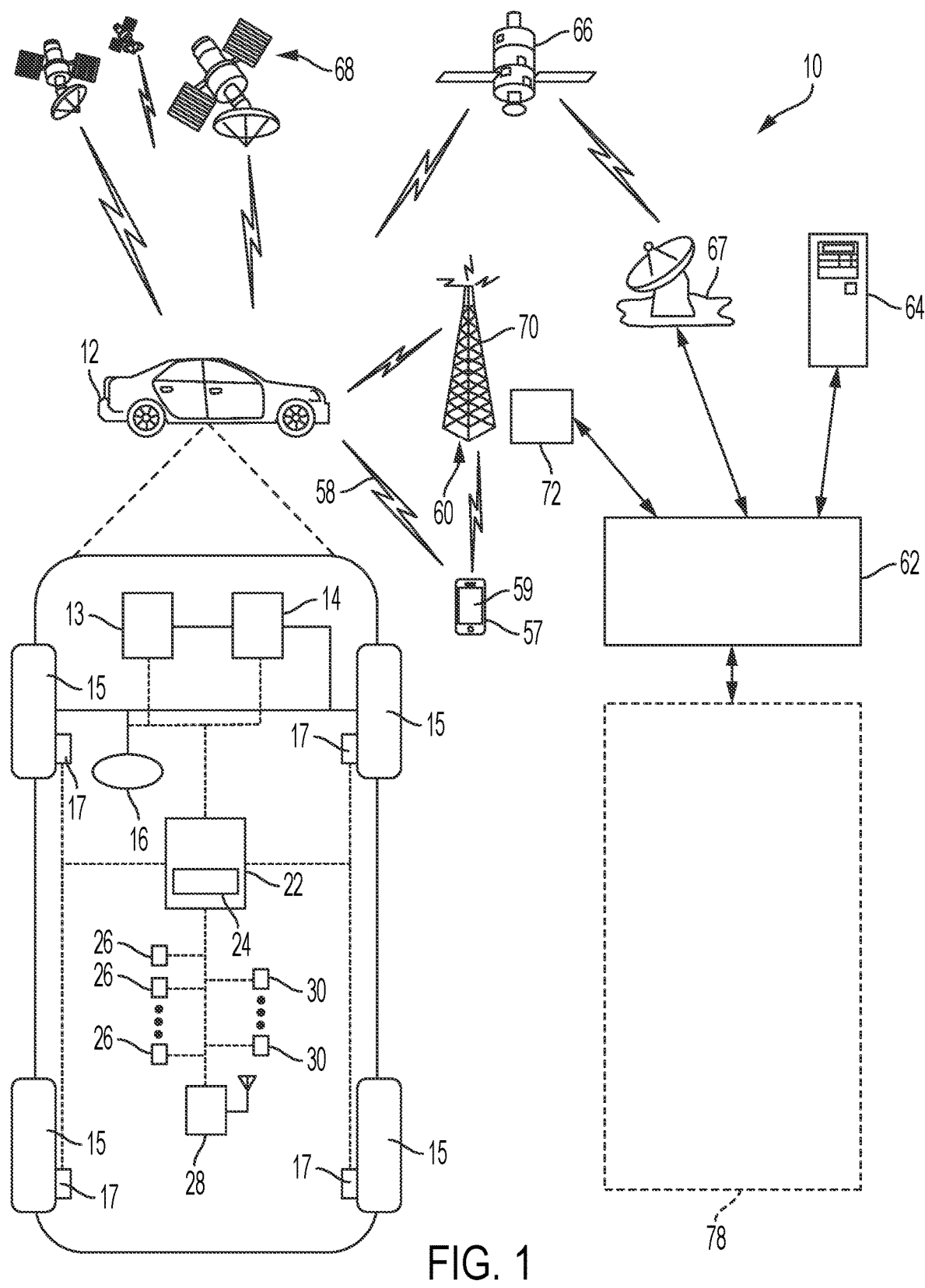
FIG. 1 is a schematic diagram of a communication system including an autonomously controlled vehicle according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an operating environment that includes a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission.

The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communications system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communications system 28 of the vehicle 12. One of the networked devices that can communicate with the vehicle 12 via the wireless communications system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62 but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communications system 28 and the wireless carrier 60. Other computers 64 can include, for example: a service center computer where diagnostic information and other vehicle data can be uploaded from the vehicle via the wireless communications system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
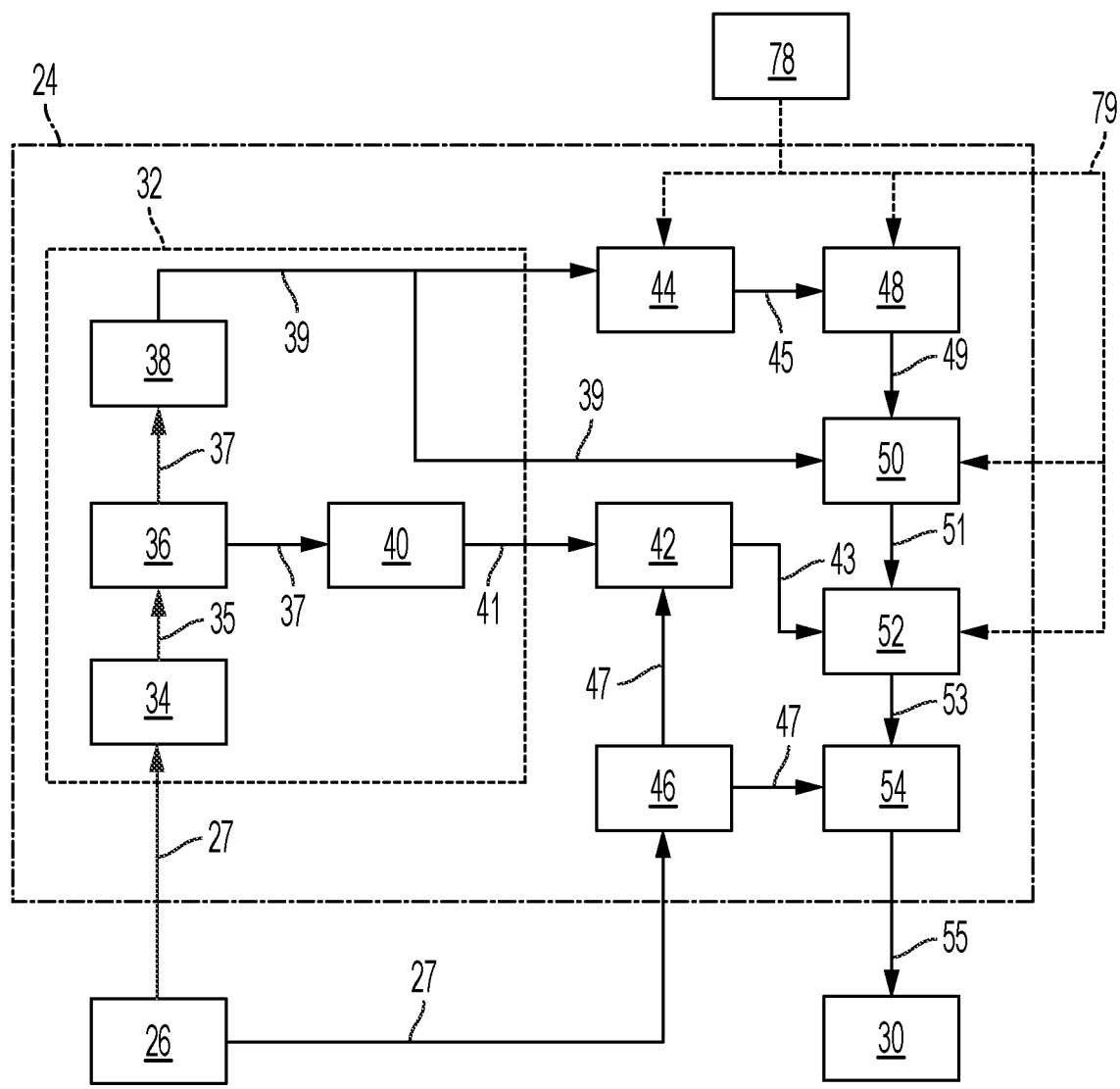
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communications system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The present disclosure describes methods and systems to generate an event structure to represent and understand situations occurring in the environment surrounding an autonomous vehicle as it travels on roadways. By analyzing and prioritizing environmental attention and behavioral attention, multiple events can be abstracted such that one representation causes the same reaction for the corresponding autonomous entities. Conventional event-describing structures use geometrical zone-based categorizations or entity-based categorizations without appropriate abstraction and generalization, thus requiring vast amounts of storage to represent large numbers of events. Therefore, the present disclosure addresses the need for representation of large numbers of events, as experience in normal operating (that is, driving) conditions. The methods and systems disclosed herein make use of a new prioritized attention-based event structure to enable effective situation awareness.

Several of the advantages of the methods and systems disclosed herein include, for example and without limitation, human perception-inspired event generation for effective situation awareness, a hierarchical structure that includes attention zones and behavioral attentions, and a risk level analysis to determine prioritized events/obstacles/vehicles/pedestrians/etc. within each attention zone. Additionally, the methods and systems disclosed herein include an urgent attention zone for dealing with anomalous events/obstacles/vehicles/pedestrians/etc. that pose an immediate concern for autonomous operation of the vehicle 12. Finally, the methods and systems disclosed herein effectively compress traffic situational information for efficient data processing. Using the methods and systems disclosed herein, information acquired from the sensors of an autonomous vehicle, such as the vehicle 12, can be applied to perceive, reason, and understand surrounding situations with a more human-like capability and with less computational complexity without losing crucial details of the events and surroundings, leading to improved navigation decisions by the ADS 24.

Appropriate situation awareness is particularly useful for autonomous driving not only to enable safe operation of the vehicle 12 but also to understand the surrounding environment and make appropriate navigational and vehicle control decisions. While it may be desirable to use and store many kinds of information during the autonomous driving decision processes performed by the ADS 24, for practical reasons, input data to the ADS 24 should be efficiently represented, stored, and used. Therefore, the ADS 24 should utilize methods and systems that are well-designed for both efficiency and sufficiency of decision-making. The methods and systems disclosed herein assess adjacent situations surrounding the vehicle 12 for urgency and threat to the vehicle's current and projected path of travel. Focusing on the immediate surroundings by combining zone attention and behavior attention and assigning weights to entities within various attention zones allows the ADS 24 to deal with multiple neighboring entities and complicated scenarios.

Figure 3:
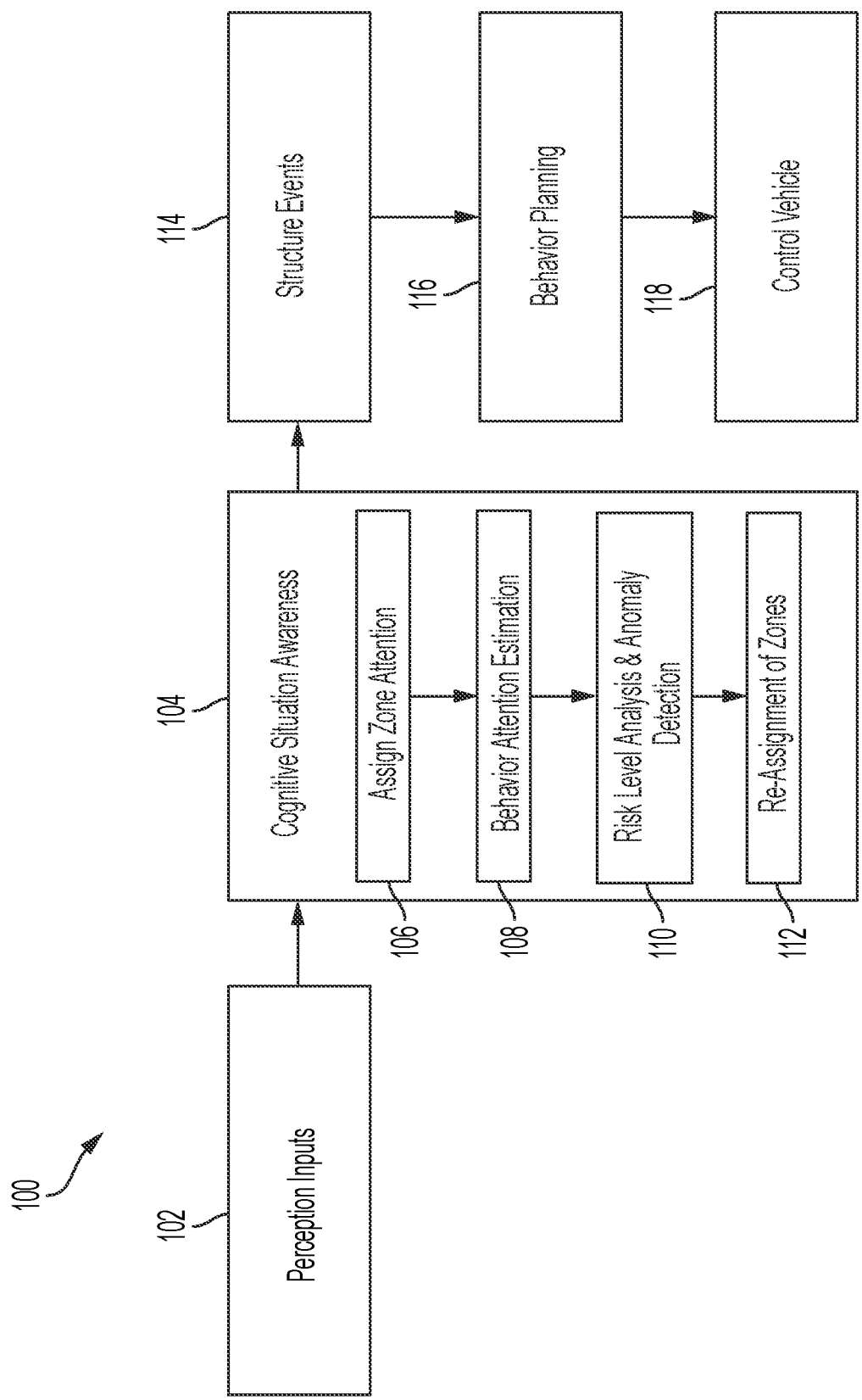
FIG. 3 is a high level flow diagram of a method for cognitive situation awareness using an attention-based event structure, according to an embodiment of the present disclosure.

FIG. 3 illustrates a high-level diagram of a method 100 to generate cognitive situation awareness using an attention-based event structure, according to an embodiment. The method 100 can be utilized in connection with the vehicle 12 and the various modules of the ADS 24 discussed herein. The method 100 can be utilized in connection with the controller 22 as discussed herein, or by other systems associated with or separate from the vehicle, in accordance with exemplary embodiments. The order of operation of the method 100 is not limited to the sequential execution as illustrated in FIG. 3, but may be performed in one or more varying orders, or steps may be performed simultaneously, as applicable in accordance with the present disclosure.

At 102, the ADS 24 receives perception inputs from the sensors 26 of the vehicle 12. In various embodiments, the perception inputs include sensor data from the variety of sensors including GPS, RADAR, LIDAR, optical cameras, thermal cameras, ultrasonic sensors, and/or additional sensors as appropriate. The perception inputs includes data on the surrounding environment as well as data on the vehicle characteristics including speed, braking, projected path of travel, etc., for example and without limitation. In various embodiments, the perception input is sensor data relative to external features, such as other vehicles, objects, pedestrians, etc. in a vicinity of the vehicle 12. In various embodiments, the perception inputs are received from the sensors 26 by the perception system 32 of the ADS 24.

The various modules of the ADS 24 process the sensor data and deliver the data, in the form of tokens, to a cognitive situation awareness module, as shown at 104. In some embodiments, the cognitive situation awareness module is a module of the ADS 24 and works in combination with the localization and mapping module 40 to estimate the position of the vehicle 12 in both typical and challenging driving scenarios. Additionally, the cognitive situation awareness module works in combination with the object prediction module 38 of the ADS 24 to further classify and generate parameters related to a location of a detected obstacle relative to the vehicle 12, a predicted path of the detected obstacle relative to the vehicle 12, and a location and orientation of traffic lanes relative to the vehicle 12. As discussed in greater detail herein, the cognitive situation awareness functions include zone attention assignments to any detected obstacles or entities in the environment surrounding the vehicle 12, behavior attention estimations for the detected obstacles or entities, risk level analysis of the detected obstacles or entities and identification of any anomalous entities or behavior, and re-assignment of zone attention assignments for any anomalous entities or behavior.

The cognitive situation awareness functions generate a corresponding hierarchical event structure, as shown at 114. The hierarchical event structure is illustrated in greater detail in FIG. 4 and discussed in greater detail below. The event structure information is then used to develop behavior planning, as shown at 116. The behavior planning may be performed by the object prediction module 38 of the ADS 24, or by another module of the ADS 24. The decision behavior, typically in the form of a trajectory, is generated from the behavior planning and is synthesized with the other information used by the path planning module 50 to generate a vehicle path to be followed to maintain the vehicle on the desired route while obeying traffic laws and avoiding any detected obstacles. The path planning output 51, including the decision behavior, is sent to the vehicle controller, such as the vehicle control module 54, as shown at 118. As described herein, the vehicle control module 54 generates one or more control signals or vehicle control output 55 that are sent to hardware of the vehicle 12, such as one or more of the actuators 30, to achieve the commanded vehicle path including, but not limited to a steering command, a braking command, and a throttle command. In various embodiments, the method 100 outlined in FIG. 3 may be performed by one controller, such as the controller 22, or may be distributed across multiple controllers of the vehicle 12, depending on the computational load, etc.

With continued reference to FIG. 3, and more specifically to the cognitive situation awareness step shown at 104, once the perception data from the sensors 26, vehicle electronic control unit (ECU) systems, and outside-feeding environment information are received by the controller 22, zone attention level assignments are made for each of the external entities in the vicinity of the vehicle, depending on the environmental data and the projected path or desired trajectory of the vehicle 12, as shown at 106. Behavior attention estimations for each of the external entities are performed at 108 for each zone, considering the relative actions of entities within the assigned zone with respect to the environmental conditions. A risk level analysis for each of the entities is performed at 110, based on the assigned zone attention and behavior attention of each entity. The risk level analysis may reveal anomalies, such as unexpected objects, unexpected behavior of the entity, and/or urgent attention zones. If needed, at 112, the attention and behavior zones of each entity are reassigned based on any detected anomalies. The analyzed and prioritized environmental attention and behavioral attention data generated in the cognitive situation awareness step 104 for each entity is stored as a hierarchical event structure at 114.

Figure 4:
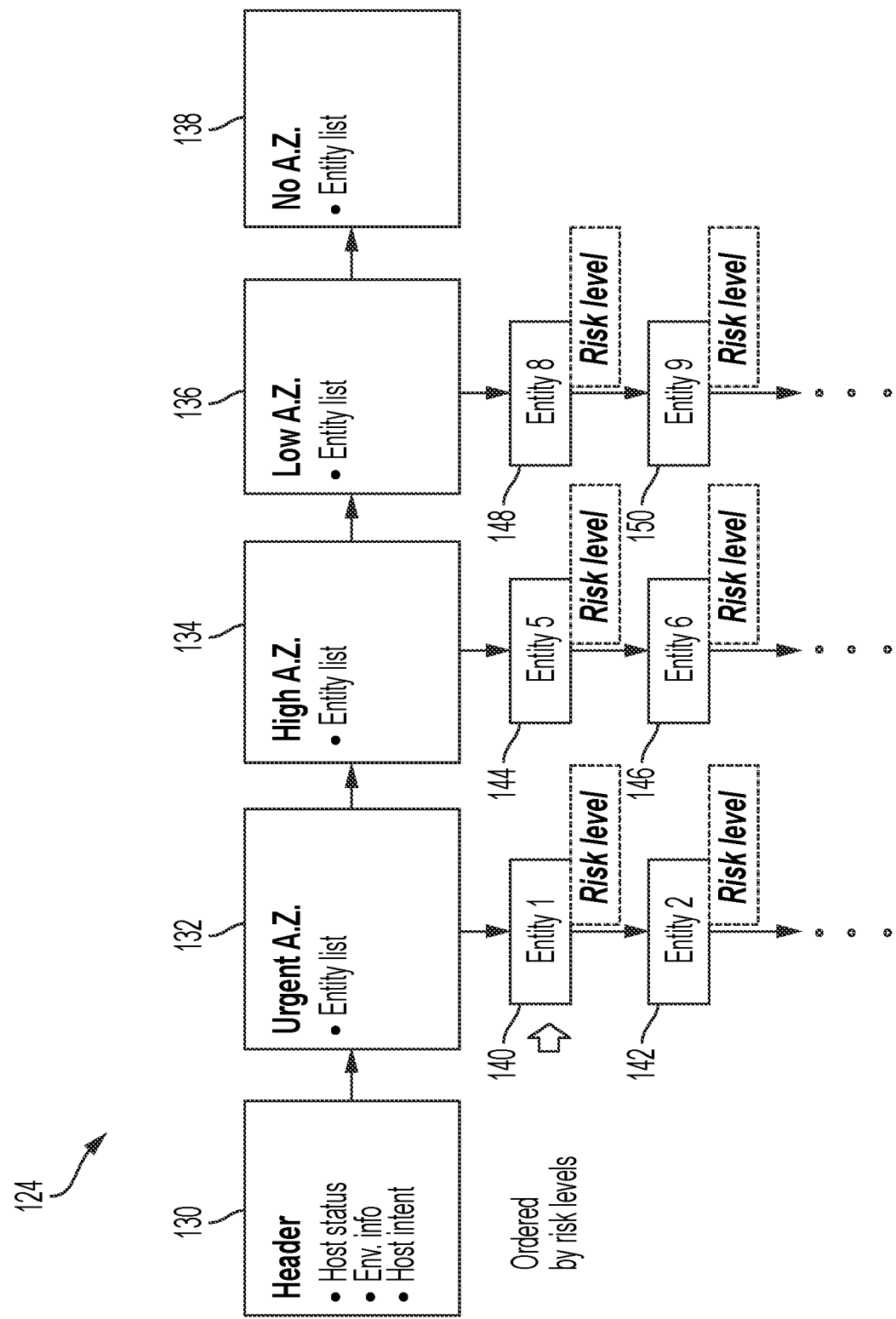
FIG. 4 is a high level flow diagram of a hierarchical event structure, according to an embodiment of the present disclosure.

A hierarchical event structure 124, according to an embodiment, is shown in FIG. 4. The highest level of the event structure 124 includes header information 130, an urgent attention zone 132, a high attention zone 134, a low attention zone 136, and a no attention zone 138. If anomalous objects or unusual activities occur in the environment surrounding the vehicle 12, that object or activity entity is listed in the urgent attention zone 132. Each of the zones are listed in order of decreasing priority, that is, entities classified in the urgent attention zone 132 receive the highest priority, entities classified in the high attention zone 134 receive the next highest priority, and so on. Entities within each zone are assigned a risk level. As shown in FIG. 4, the entities 140, 142 within the urgent attention zone 132 are assigned risk levels. The entities within each zone are ordered by risk level, with entities having the highest risk level ordered higher than entities having a lower risk level. Similarly, the entities 144, 146 are classified within the high attention zone 134 and are assigned risk levels and ordered appropriately. Additionally, the entities 148, 150 are classified within the low attention zone 136 and are ordered according to their assigned risk level. Environmental considerations, such as the known traffic pattern in the area enables selective storage of entities at or above a predetermined risk threshold. Entities that are classified in the no attention zone 138 are not stored to reduce computational storage requirements.

Attention zones in the environment surrounding the vehicle 12 are determined using various factors including, for example and without limitation, the projected path of the vehicle 12 (for example, a left turn, a right turn, etc.), the traffic environment (a straight road, an intersection, the number of lanes, the position of the vehicle 12 on the roadway, etc.), and possible paths that could lead to an impact with an object or other vehicle, according to the road structure (such as areas directly in front of the vehicle 12, a merging lane, etc.).

Figure 5:
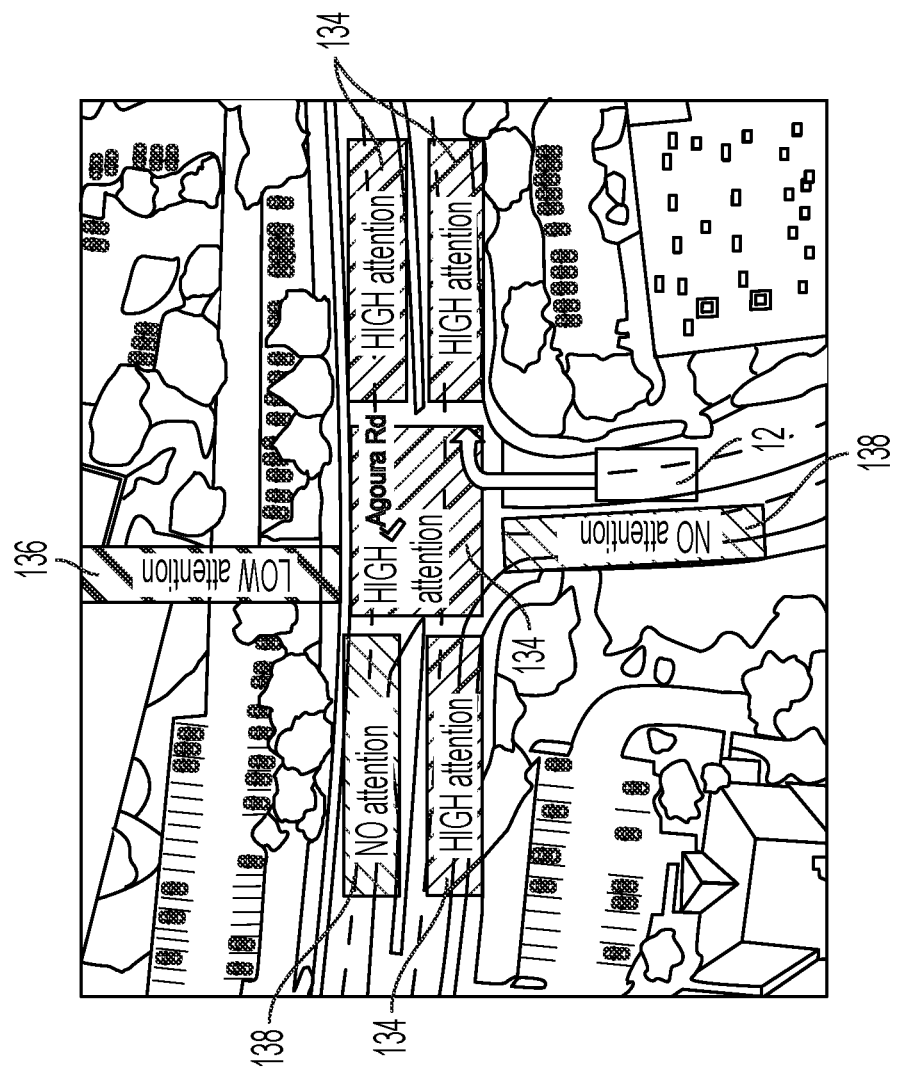
FIG. 5 is a schematic diagram of a cognitive situation awareness event, according to an embodiment of the present disclosure.
Figure 6:
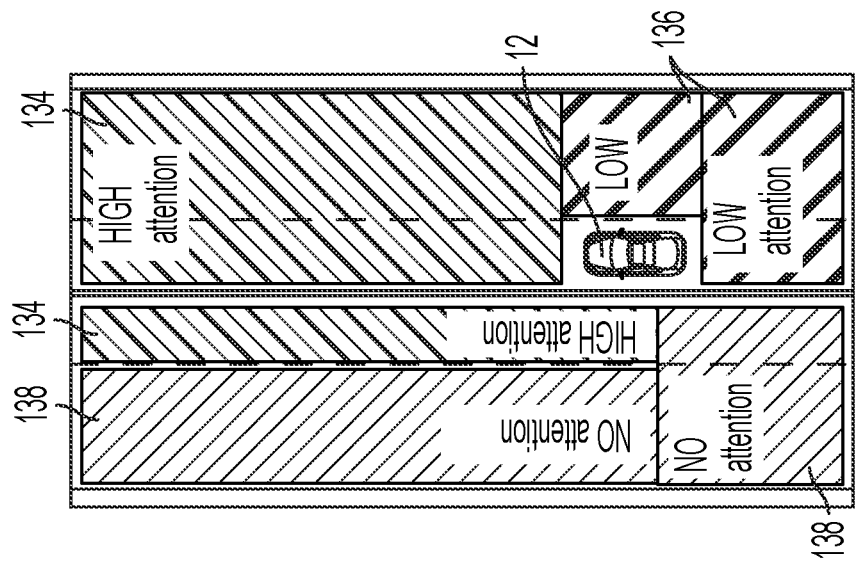
FIG. 6 is a schematic diagram of another cognitive situation awareness event, according to an embodiment of the present disclosure.

Two examples of zone attention assignments for common autonomous driving scenarios are shown in FIGS. 5 and 6. FIG. 5 illustrates the vehicle 12 approaching an intersection with the intent of making a right turn. The area of the intersection itself is classified as a high attention zone 134. Other high attention zones 134 include the lanes of travel both ahead of and behind the vehicle 12 once the vehicle 12 has made the right turn in the intersection. Additionally, the lanes of travel in the opposite direction of the intended path of travel of the vehicle 12 is classified as a high attention zone 134. Each of the areas in FIG. 5 that are classified as high attention zones 134 are areas that the vehicle 12 intends to enter during the projected path of travel and/or areas where other vehicles or pedestrians could interfere with the projected path of the vehicle 12. Additionally, areas in which other vehicles have the right of way are also classified as high attention zones 134.

With continued reference to FIG. 5, the area of the intersection directly opposite the vehicle 12 is designated as a low attention zone 136. Areas that are classified as low attention zones 136 are areas that other vehicles or pedestrians may be present, but the probability that vehicles or pedestrians in these areas will interfere with the projected path of travel of the vehicle 12 is lower than in an area classified as a high attention zone 134.

As shown in FIG. 5, two areas are classified as no attention zones 138. The no attention zones 138 are areas in which other vehicles, objects, and/or pedestrians may be present, but are classified as not likely to interfere with the projected path of travel of the vehicle 12, unless these other vehicles, objects, and/or pedestrians exhibit abnormal behaviors. Abnormal behaviors include, for example and without limitation, a vehicle leaving an expected lane of travel or a pedestrian crossing a street outside of a designated crossing area.

Another example of zone attention assignments is shown in FIG. 6. In this example, the vehicle 12 is traveling along a roadway having multiple lanes of travel in each direction. The areas directly in front of the vehicle 12 and the lane of travel in the opposite direction immediately to the left of the vehicle 12 are classified as high attention zones 134. The areas behind the vehicle 12 and immediately to the right of the vehicle 12 are classified as low attention zones 136. Finally, the lanes of travel going in the opposite direction of the vehicle 12 that are behind the vehicle 12 (that is, vehicles within these lanes of travel have already passed the vehicle 12 and the vehicle 12 is moving away from these vehicles) and opposite lanes of travel that are separated by at least one lane of travel from the vehicle 12 are classified as no attention zones 138.

Figure 7:
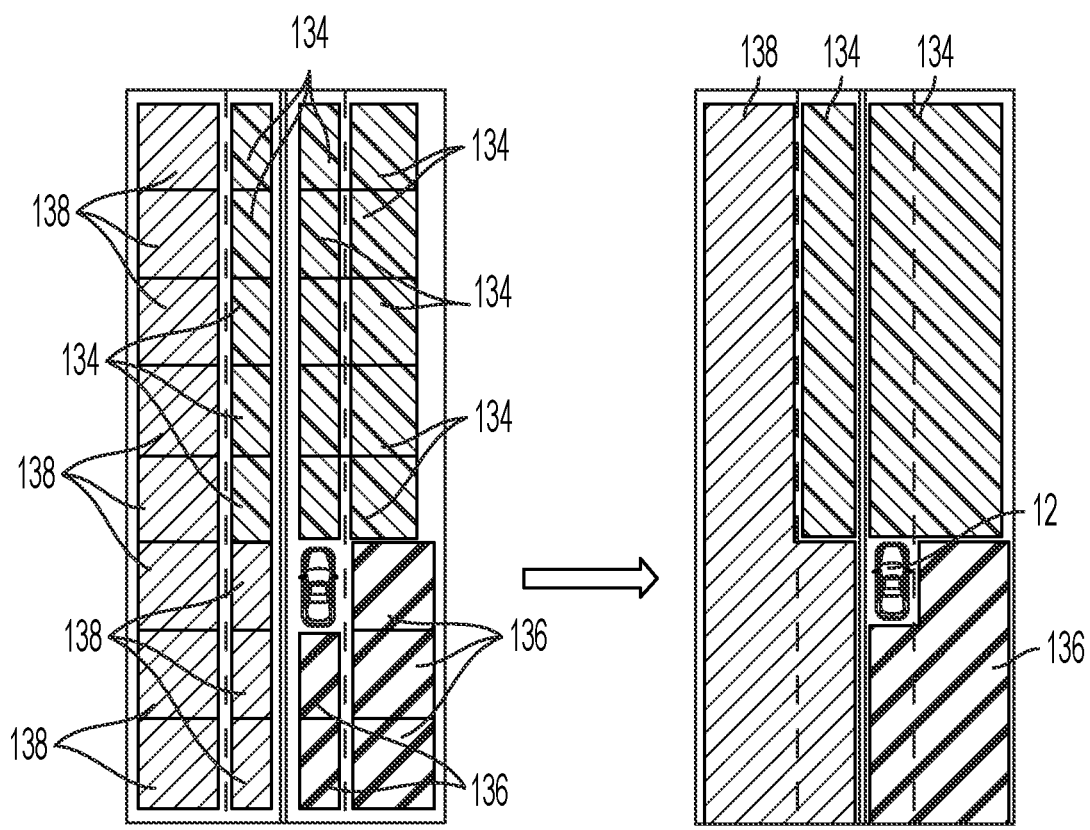
FIG. 7 is a schematic diagram of a cognitive situation awareness event, illustrating the merge of similar attention zones, according to an embodiment of the present disclosure.

As discussed herein, vehicles, objects, and/or pedestrians within any zone, and in particular in the no attention zones 138, can be classified as urgent attention zones or objects, if the sensors of the vehicle 12 detect unexpected behaviors that could interfere with the projected path of the vehicle 12. Urgent attention zones are assigned when the risk value is estimated. In various embodiments, the attention zones shown in FIGS. 5 and 6 are based on the amalgamation of attention zone types assigned to cells or zone elements in the environment surrounding the vehicle 12. These cells or zone elements are shown in the left panel of FIG. 7, with the merged attention zones illustrated in the right panel of FIG. 7.

In various embodiments, the information used to allocate the zone assignments is obtained from two sources: a priori map data from the navigation system, such as the GPS of the vehicle 12, and perception data from the sensors 26 of the vehicle 12. As noted herein, the controller 22 completes accurate and robust environment-to-map correspondences and perceptions outputs via the various modules of the ADS 24. Once zone attentions are assigned to the neighboring zone elements (such as other vehicles, objects, obstacles, pedestrians, etc.), the elements of the same zone attention levels are merged as shown in the right panel of FIG. 7.

Each neighboring vehicle, object, or pedestrian, $x_i$, in a zone has its own zone attention level value, $L_{ZA}(x_i)$ assigned by the corresponding attention zone. In one example, high attention zones assign a zone attention level value $L_{ZA}(x_i)=0.8$ to the external entities, including vehicles, objects, or pedestrians, within the high attention zone 134, low attention zones assign a zone attention level value $L_{ZA}(x_i)=0.4$ to the vehicles, objects, or pedestrians within the low attention zone 136, and no attention zones assign a zero zone attention level value to the vehicles, objects, or pedestrians within the low attention zone 138.

In another example, a zone attention level value is calculated as:

$$L_{ZA}(x_i)=S_{xi}(Z+\alpha C(x_i))$$

Where Z is the baseline zone attention level value $\{0, 0.4, 0.8\}$ for no, low, and high attention zones 138, 136, 134, respectively; $C(x_i)$ is the computation of complexity for the external entity, that is the vehicle, object, or pedestrian; and $S_{xi}$ is a sigmoid function.

Each attention zone can contain multiple entities or agents, each of which has its own behavior attention level value assigned based various factors. These factors include, but are not limited to, the entity's position in relation with the corresponding lane of the road or path of travel of the vehicle 12, the velocity of the entity in relation with the desired speed of the vehicle 12, and the heading angle of the entity in relation with the corresponding lane of the road or path of travel of the vehicle 12.

To obtain the behavior attention level value, these factors are combined using one of the following exemplary methods. In one method, the kinematic information of the entity is used. The behavior attention level value assigned to the entity depends on the relative location, velocity, and heading of the entity. The relativity is determined by the difference between the entity's actual behavior from the entity's expected behavior (that is, the differences between the entity's actual location, velocity, and heading from the entity's expected location, velocity, and heading). For an autonomous vehicle, such as the vehicle 12, the actual path of the entity should align with the expected entity trajectory. In various embodiments, the behavior attention level value is obtained from the following equation:

$$L_{BA}(x_i)=f_{BA1}(p_{xi}-p_D, v_{xi}-v_D, h_{xi}-h_D)$$

Where $(p_{xi}, v_{xi}, h_{xi})$ is the position, velocity, and heading angle of the corresponding entity $x_i$, $p_D$ is the desired position of the entity within the road lane when the entity is not intending to make a lane change, $v_D$ is the desired velocity of the entity relative to the speed limit, and $h_D$ is the desired heading angle of the entity within the road lane when the entity is not intending to make a lane change.

In various embodiments, the behavior attention level value is obtained as a weighted summation of sigmoid functions of each component, expressed as:

$$L_{BA}(x_i)=\alpha \cdot S_p(p_{xi}-p_D)+\beta \cdot S_v(v_{xi}-v_D)+(1-\alpha-\beta) \cdot S_h(h_{xi}-h_D)$$

Where $\alpha$ and $\beta$ are weights such that $(0 \leq \alpha+\beta \leq 1)$ and $S_m(n)$ is the sigmoid function for the 'm' component which converges beyond the minimum and maximum 'n' values. When the individual component deviation increases, $L_{BA}(x_i)$ also increases, meaning the entity's attention level value is increased.

In various embodiments, pre-trained information is used to obtain the behavior attention level value for each entity. Assuming a certain entity x in the environment has m possible trained paths, $x_i$, where i=1 ... m represents the entity's possible paths. An observation $z_{t-k:t}$ from time t–k to t can build a probability $P(x_i|z_{t-k:t})$ for each feasible trained path. In various embodiments, the probability is acquired by likelihood estimation. In normal situations, that is, situations in which the entity does not have any abnormal behavior or issues, at least one expected action should have a higher probability than a threshold probability for unexpected behavior, expressed as $p_{th}$. In mathematical form, the following relation occurs:

$$\exists_{xi \in x} P(x_i|z_{t-k:t}) > p_{th}$$

Alternately, in anomalous situations, that is, situations in which the entity exhibits abnormal behavior or issues, all possible expected actions cannot have a higher probability than $p_{th}$, and the following relation occurs:

$$\exists_{xi \in x} P(x_i|z_{t-k:t}) < p_{th}$$

Therefore, the behavior attention level value is acquired as a function of each entity's expected motion probability and the anomaly threshold probability as shown below:

$$L_{BA}(x_i) = f_{BA2}(P(x_i|z_{t-k:t}), p_{th})$$

Figure 8:
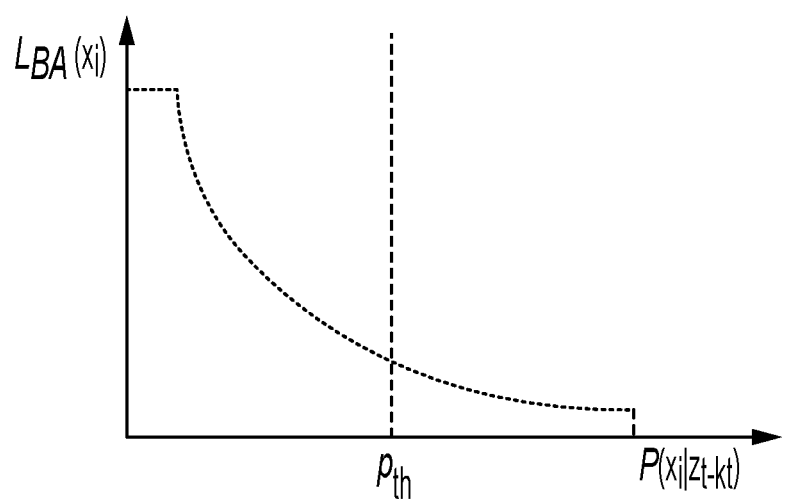
FIG. 8 is a graphical representation of probability-based behavioral attention, according to an embodiment of the present disclosure.

The function $f_{BA2}(\bullet)$ can be defined as an inverse of the exponential of the expected motion probability as shown in FIG. 8. As shown in FIG. 8, if the probability becomes smaller than the threshold value, the behavioral attention level value becomes drastically larger (moving from right to left in the illustrated graph).

In mathematical form, the behavior attention level value is calculated as:

$$L_{BA}(x_i) = L_{BA}^{max} \text{ if } P(x_i|z_{t-k:t}) < p_{min}$$

$$L_{BA}(x_i) = L_{BA}^{max} \cdot e^{-\alpha(P(x_i|z_{t-k:t}) - p_{min})} \text{ if } p_{min} < P(x_i|z_{t-k:t}) < p_{th}$$

$$L_{BA}(x_i) = L_{BA}^{th} \cdot e^{-\beta(P(x_i|z_{t-k:t}) - p_{th})} \text{ if } P(x_i|z_{t-k:t}) < p_{th}$$

Where $L_{BA}^{max}$ is the maximum behavior attention level value, $L_{BA}^{th}$ is the behavior attention level value at $p_{th}$, $p_{min}$ is the probability of achieving $L_{BA}^{max}$, $\alpha$ and $\beta$ are coefficients for the exponents with $\alpha > \beta$. Using this mathematical expression, the changing rate of $L_{BA}(x_i)$ becomes higher when the probability is smaller than $p_{th}$.

After obtaining the zone attention level value, $L_{ZA}$, and the behavior attention level value, $L_{BA}$, for each entity, the controller 22 estimates the risk value of the corresponding entity to the projected path or current location of the vehicle 12. In various embodiments, the risk value is estimated as:

$$R(x_i) = f_R(L_{ZA}(x_i), L_{BA}(x_i))$$

In some embodiments, $R(x_i)$ is the multiplication of the two attention level values:

$$R(x_i) = L_{ZA}(x_i) \cdot L_{BA}(x_i)$$

Once the risk value for each entity is known, multiple entities within the same attention zone (such as the high attention zone 134 and the low attention zone 136) can be ordered as shown in FIG. 4. Only those entities with the risk values higher than a certain risk threshold, $r_{th}$, are ordered in the hierarchical event structure 124.

Additionally, if $R(x_i) > r_{UA}$, where $r_{UA}$ is the risk threshold value for an urgent attention zone entity, the entity is added to an existing urgent attention zone 132 or an urgent attention zone 132 is created if it does not already exist in the hierarchical event structure 124. Entities within the urgent attention zone 132 are given the highest priority, that is, the ADS 24 considers these entities most important when determining whether any changes should be made to the projected path of the vehicle 12. Risk values for an entity that are greater than $r_{UA}$ are generally, if not always, caused by anomalous traffic situations.

When a new event queue is generated for a similar event, the two events are compared in order of zone attention level (that is, the urgent attention zone level is compared, then the high attention zone level, followed by the low attention zone level). Within each zone, the corresponding entities are considered in order of risk values.

One benefit of the method 100 to generate cognitive situation awareness using the hierarchical event structure 124 is a more efficient use of storage space. For most traffic situations, such as the two examples shown in FIGS. 5 and 6, the number of meaningful entities, that is, entities having a risk value greater than the risk threshold, is approximately 10. The information for each entity, including attention zone type, location or pose relative to the vehicle 12, and the risk value requires much less storage space than other methods for evaluating environmental conditions and potential interactions with the vehicle 12. Using the cognitive situation awareness, as discussed herein, effectively reduces the amount of traffic situational information for efficient data processing by the controller.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be onboard as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle, comprising:
receiving, by a controller, perception input data from a sensor of the vehicle;
processing, by the controller, the perception input data to classify and generate parameters related to an external entity in a vicinity of the vehicle using human perception inspired cognitive analysis, wherein processing the perception input data includes calculating a risk level value for the external entity;
generating, by the controller, a hierarchical event structure that classifies and prioritizes the perception input data by classifying the external entity into an attention zone, wherein the attention zone is one of a high attention zone, a low attention zone, and a no attention zone, and prioritizing the external entity within the classified attention zone according to the risk level value;
developing, by the controller, a behavior plan for the vehicle based on the hierarchical event structure; and
generating, by the controller, a control signal to control an actuator of the vehicle according to the behavior plan.

2. The method of claim 1, wherein the perception input data includes entity data relative to the external entity in the vicinity of the vehicle including one or more of a lane position of the external entity in the vicinity of the vehicle, a predicted path of the external entity relative to the vehicle, and a location and orientation of one or more traffic lanes relative to the vehicle, and the perception input data also includes vehicle characteristic data of the vehicle including one or more of vehicle speed, braking, and projected path of travel of the vehicle.

3. The method of claim 2, wherein processing the perception input data using human perception inspired cognitive analysis includes generating a zone attention level value for the external entity, estimating a behavior attention level value for the external entity, and calculating the risk level value for the external entity based on the zone attention level value for the external entity and the behavior attention level value for the external entity; and
further including determining if an anomaly is detected, and, when the anomaly is detected, changing the zone attention level value for the external entity.

4. The method of claim 3, wherein generating the zone attention level value for the external entity includes evaluating the predicted path of the external entity relative to the vehicle, the location and orientation of the one or more traffic lanes relative to the vehicle, and the projected path of travel of the vehicle.

5. The method of claim 4, wherein a higher risk level value indicates a higher priority within the attention zone.

6. The method of claim 3, wherein the zone attention level value for the external entity expressed as $x_i$ is calculated as $L_{ZA}(x_i) = S_{xi}(Z + \alpha C(x_i))$, where Z is a baseline zone attention level value for the external entity, $C(x_i)$ is a computation of complexity for the external entity, and $S_{xi}$ is a sigmoid function.

7. The method of claim 6, wherein the baseline zone attention level value, Z, is zero for the no attention zone, 0.4 for the low attention zone, and 0.8 for the high attention zone.

8. The method of claim 3, wherein the behavior attention level value for the external entity, represented as $x_i$, is calculated as $L_{BA}(x_i)=f_{BA1}(p_{xi}-p_D, v_{xi}-v_D, h_{xi}-h_D)$, where $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, and $h_D$ is a desired heading angle of the external entity.

9. The method of claim 1, wherein the risk level value for the external entity, represented as $x_i$, expressed as x, is calculated as $R(x_i)=L_{ZA}(x_i) \cdot L_{BA}(x_i)$.

10. The method of claim 3, wherein the behavior attention level value for the external entity, represented as $x_i$, is calculated as $L_{BA}(x_i)=\alpha \cdot S_p(p_{xi}-p_D)+\beta \cdot S_v(v_{xi}-v_D)+(1-\alpha-\beta) \cdot S_h(h_{xi}-h_D)$, where $\alpha$ and $\beta$ are weights such that $(0 \leq \alpha+\beta \leq 1)$, $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, $h_D$ is a desired heading angle of the external entity, and $S_m(n)$ is a sigmoid function for an 'm' component which converges beyond minimum and maximum 'n' values.

11. An automotive vehicle, comprising:
a plurality of environment sensors configured to detect external features in a vicinity of the automotive vehicle;
a plurality of vehicle sensors configured to detect a vehicle characteristic;
an actuator configured to control vehicle steering, acceleration, braking, or shifting; and
at least one controller in electronic communication with respective sensors of the plurality of environment sensors, the plurality of vehicle sensors, and the actuator, the at least one controller being programmed with an automated driving system control algorithm and configured to automatically control the actuator based on the automated driving system control algorithm, the automated driving control system algorithm including:
a perception system configured to receive perception input data from the plurality of environment sensors and vehicle characteristic data from the plurality of vehicle sensors;
a cognitive situation awareness module configured to process the perception input data and the vehicle characteristic data to analyze an external entity in the vicinity of the automotive vehicle using a human perception inspired cognitive analysis, wherein processing the perception input data includes calculating a risk level value for the external entity, and the analysis includes generating a hierarchical event structure that classifies and prioritizes the perception input data by classifying the external entity into an attention zone, wherein the attention zone is one of a high attention zone, a low attention zone, and a no attention zone, and prioritizing the external entity within the classified attention zone according to the risk level value; and
a vehicle control module configured to develop a behavior plan for the automotive vehicle based on the hierarchical event structure, wherein the behavior plan includes a projected path of travel;
wherein the at least one controller is further programmed to control the actuator according to the behavior plan.

12. The automotive vehicle of claim 11, wherein the cognitive analysis performed by the cognitive situation awareness module includes generating a zone attention level value for the external entity, estimating a behavior attention level value for the external entity, and calculating the risk level value for the external entity based upon the zone attention level value and the behavior attention level value; and further including determining if an anomaly is detected, and, when the anomaly is detected, changing the attention zone for the external entity.

13. A method of using perception-inspired event generation for situation awareness for a vehicle, comprising:
receiving, by a controller, perception input data from a sensor of the vehicle;
processing, by the controller, the perception input data to classify and generate parameters related to an external entity in a vicinity of the vehicle, wherein processing the perception input data includes calculating a risk level value for the external entity;
generating, by the controller, a hierarchical event structure that classifies and prioritizes the perception input data by classifying the external entity into an attention zone, wherein the attention zone include at least one of a high attention zone, a low attention zone and a no attention zone, and prioritizing the external entity within the attention zone according to the risk level value for the external entity, wherein a higher risk level value indicates a higher priority within the attention zone; and
developing, by the controller, a behavior plan for the vehicle based on the hierarchical event structure.

14. The method of claim 13, wherein the perception input data includes entity data relative to the external entity in the vicinity of the vehicle including one or more of a lane position of the external entity in the vicinity of the vehicle, a predicted path of the external entity relative to the vehicle, and a location and orientation of one or more traffic lanes relative to the vehicle, and the perception input data also includes vehicle characteristic data of the vehicle including one or more of vehicle speed, braking, and a projected path of travel of the vehicle.

15. The method of claim 14, wherein processing the perception input data includes generating a zone attention level value for the external entity, estimating a behavior attention level value for the external entity, and calculating the risk level value for the external entity based on the zone attention level value and the behavior attention level value; and
further including determining if an anomaly is detected, and, when the anomaly is detected, changing the zone attention level value for the external entity.

16. The method of claim 15, wherein when the anomaly is detected, the external entity is classified in an urgent attention zone.

17. The method of claim 15, wherein generating the zone attention level value for the external entity comprises evaluating the predicted path of the external entity relative to the vehicle, the location and orientation of the one or more traffic lanes relative to the vehicle, and the projected path of travel of the vehicle.

18. The method of claim 15, wherein the behavior attention level value for the external entity, represented as $x_i$, is calculated as $L_{BA}(x_i)=\alpha \cdot S_p(p_{xi}-p_D)+\beta \cdot S_v(v_{xi}-v_D)+(1-\alpha-\beta) \cdot S_h(h_{xi}-h_D)$, where $\alpha$ and $\beta$ are weights such that $(0 \leq \alpha+\beta \leq 1)$, $(p_{xi}, v_{xi}, h_{xi})$ represents a position, velocity, and heading angle of the external entity $x_i$, $p_D$ is a desired position of the external entity, $v_D$ is a desired velocity of the external entity relative to a speed limit, $h_D$ is a desired heading angle of the external entity, and $S_m(n)$ is a sigmoid function for an 'm' component which converges beyond minimum and maximum 'n' values.

19. The method of claim 13, wherein the risk level value is compared to a predetermined risk threshold and, when the risk level value is below the predetermined risk threshold, the external entity is classified in the no attention zone, and the perception input data regarding the external entity is not stored by the controller.

20. The method of claim 13, wherein, when the anomaly is detected, the external entity is classified in an urgent attention zone.

\* \* \* \* \*